P. M. RAVENSKILDE.
PHONOGRAPH.
APPLICATION FILED OCT. 20, 1908.

948,675.

Patented Feb. 8, 1910.
7 SHEETS—SHEET 5.

Witnesses:

Inventor:
Peter M. Ravenskilde
By Joshua R. H. Potts
Attorney.

UNITED STATES PATENT OFFICE.

PETER M. RAVENSKILDE, OF CABERY, ILLINOIS.

PHONOGRAPH.

948,675.             Specification of Letters Patent.      Patented Feb. 8, 1910.

Application filed October 20, 1908. Serial No. 458,611.

*To all whom it may concern:*

Be it known that I, PETER M. RAVENSKILDE, a citizen of the United States, residing at Cabery, county of Ford, and State of Illinois, have invented certain new and useful Improvements in Phonographs, of which the following is a specification.

My invention relates to new and useful improvements in phonographs, and has for its object to provide a device of this character having a rotatable element adapted to carry a plurality of phonographic records to be played.

A further object is to provide a coin-actuated means for starting the motor.

A further object is to provide means adapted to intermittently rotate the record-carrying element a part of a revolution.

A further object is to provide a movable means adapted to intermittently engage and rotate one of the record-holders while the record carried thereby is being played.

A further object of the invention is to provide means for engaging and disengaging the needle of the reproducer with and from the phonographic records.

A further object is to provide means for automatically carrying the reproducer back to the starting point after having played a record.

A further object is to provide a mechanism adapted to release a brake lever to allow the motor to run long enough to cause two records to be played and then actuate said brake lever for stopping the motor.

A still further object is to provide a clock-controlled means for starting the motor.

With these and other objects in view my invention consists in the novel features of construction, arrangement and combination of parts as will be more fully described hereinafter, illustrated in the accompanying drawings, and finally pointed out in the claims hereto appended, it of course, being understood that I do not desire to limit myself to the exact construction and location of the several parts, but entitle myself to such advantages as in the form, size and minor details of construction that may fall within the scope of my invention without departing from the spirit or sacrificing any of the advantages thereof.

Referring to the drawings forming a part of this specification, wherein like characters of reference denote similar parts throughout the several views.

Figures 15, 16, 17:
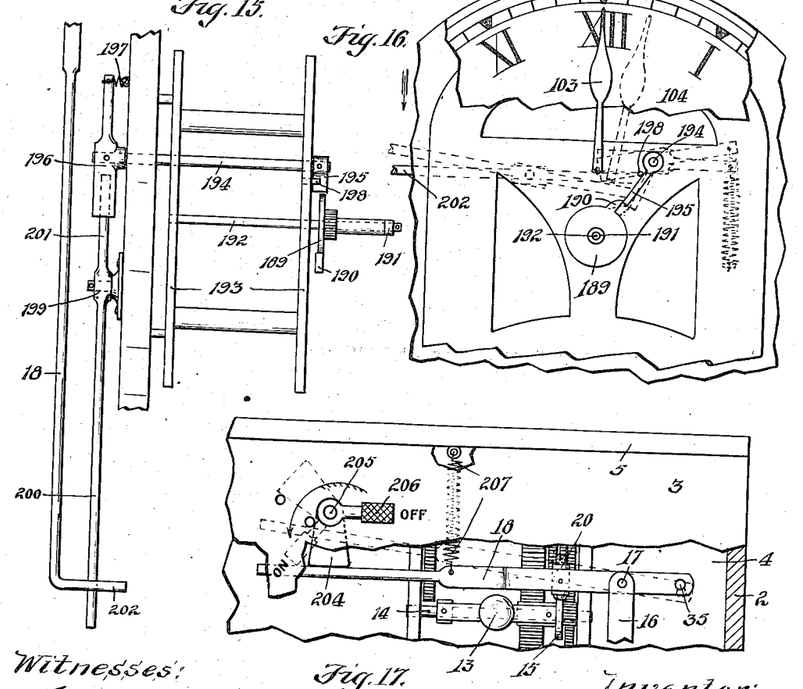
Fig. 15 is a modification of my invention showing the clock-controlled means for releasing the brake lever from the governor frictional wheel for the length of time sufficient to play one record.
Fig. 16 is a front view of a portion of the clock showing the cam and lever actuated thereby.
Fig. 17 is a front view of the modification of my invention showing the brake lever actuated by means of a cam which cam is adapted to be actuated at will so as to play as many records as desired in succession.

When the means described in Figs. 15, 16 and 17 are employed, the coin and cam-actuated means may be discarded, or if desired, the coin and cam-controlled means may be used in connection with the clock mechanism but not with the cam element described in Fig. 17.

In carrying out the aim of my invention, I employ a suitable housing or casing A comprising the sides 1 and 2, the front 3, the back 4, the top 5 and the bottom 6. The sides 1 and 2, the front 3 and the back 4 are each provided with a shoulder 7 adapted to support the edges of the plate 8 upon which the motor B is suitably secured in position by means of any well known fastening devices. The compartment 9 formed between the bottom 6 and motor-supporting plate 8, is adapted to be used as a money compartment for receiving the coins which are placed in the coin-chute for causing the phonographic records to be played. The motor B is shown as a spring motor, although an electric motor may be employed, if desired. The spring motor B is mounted in a suitable frame 10 provided with a main drive shaft 11 journaled therein and upon the end of which is mounted or secured, a suitable gear 12. Located adjacent the motor B and adapted to be rotated thereby at any suitable speed, is a governor 13, the speed of which is governed by the amount of gearing connecting the governor-shaft 14 with the main-shaft 11 of the motor B. The governor-shaft 14 is provided with a friction wheel 15 as clearly shown in Figs. 2, 3 and 4.

Figure 2:
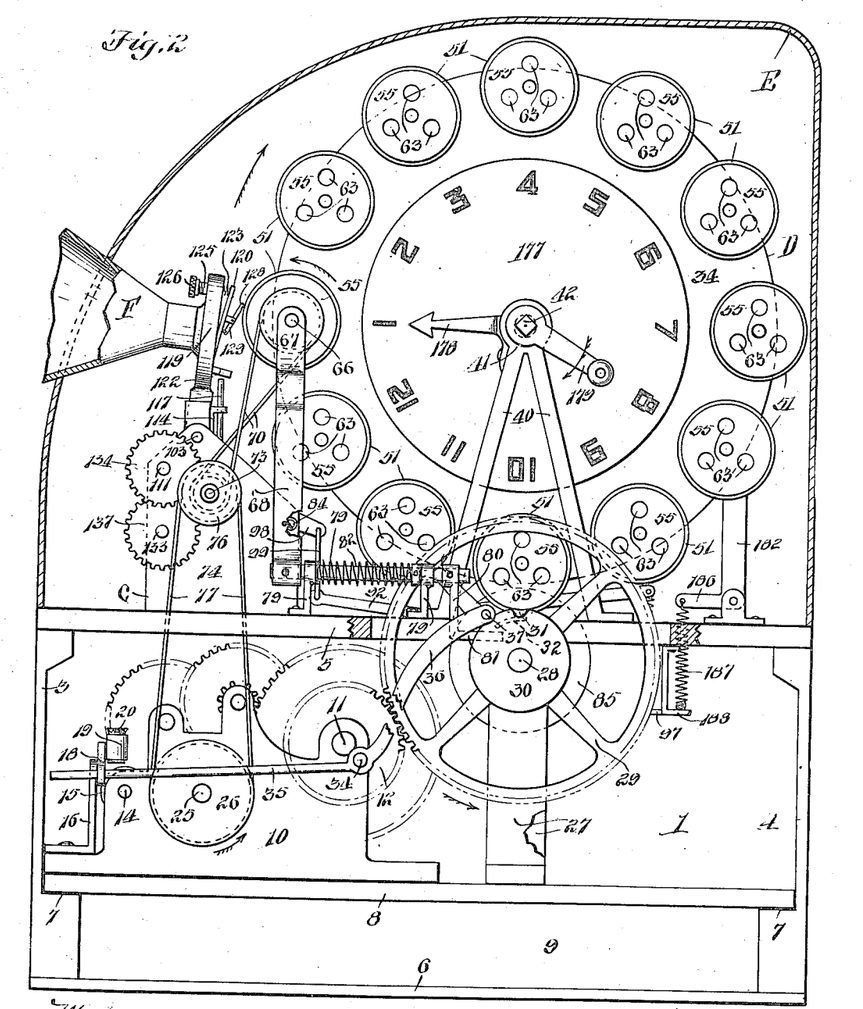
Fig. 2 is a right-hand side elevation of the phonograph with the side of the casing and parts attached thereto removed.
Figure 4:
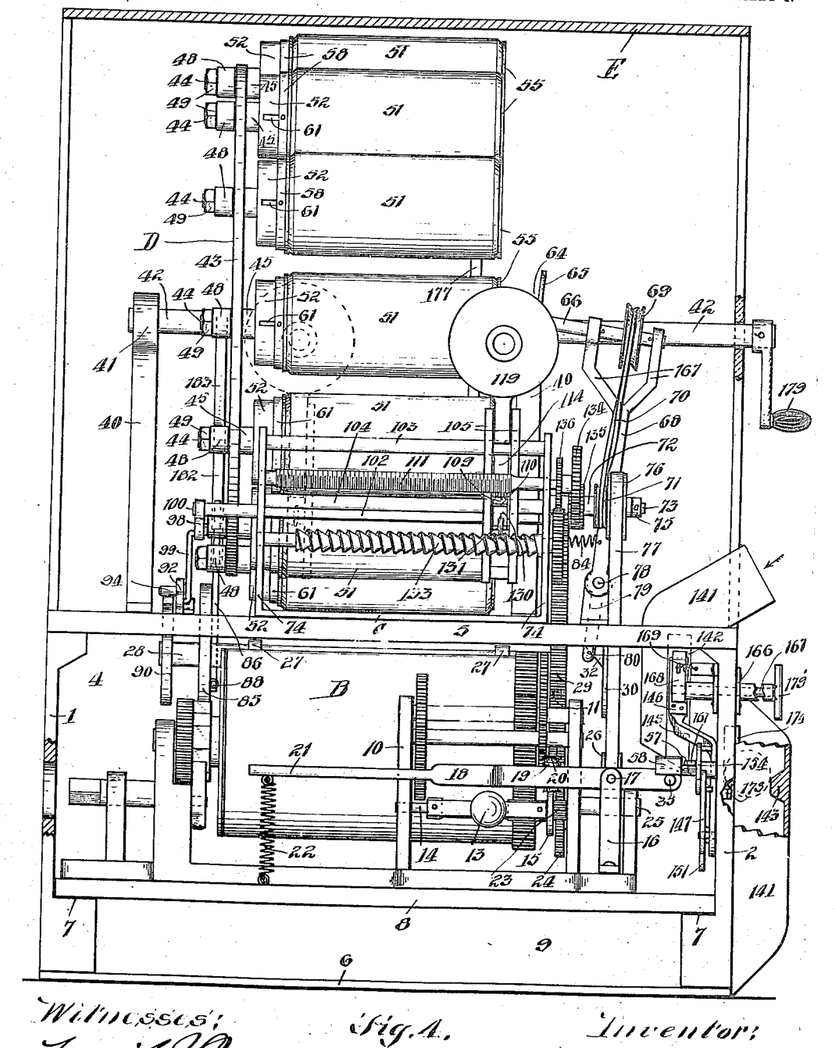
Fig. 4 is a front elevation of the phonograph with the end of the casing thereof removed.

Pivotally connected to the standard or bracket 16 by means of the pin 17, is a brake lever 18 which is provided with a holder 19 adapted to receive a felt or other suitable fabric element 20, which element is adapted to engage the periphery of the friction wheel 15 to stop the motor B when held in engagement therewith, as clearly shown in Figs. 2 and 4. The free or long end 21 of the lever 18 is connected with the motor-supporting plate 8 by means of the coil spring 22 which spring normally holds the lever 18 in a horizontal position so as to hold the fabric material 20 in engagement with the friction wheel 15 to prevent the rotation thereof.

Secured to the governor-shaft 14 adjacent the friction wheel 15 thereto, is a gear 23 which is adapted to mesh with a gear 24, which last-mentioned gear is adapted to be secured to the shaft 25 as clearly shown in Figs. 2 and 4. Secured to the outer end of this shaft 25 is a belt wheel 26 as shown in Fig. 2.

Figure 3:
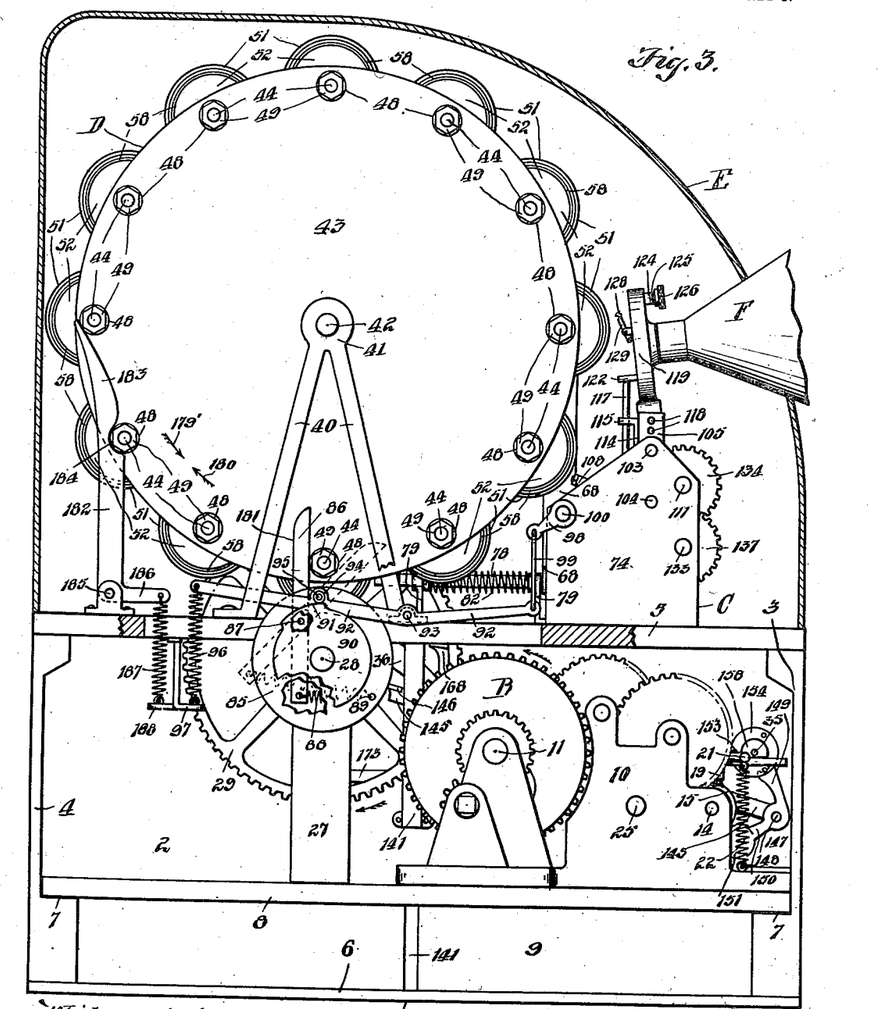
Fig. 3 is a left-hand side elevation of the phonograph with the side of the casing thereof removed.

Suitably secured to the motor-supporting plate 8 adjacent the motor B, as clearly shown in Figs. 2 and 3, is a pair of suitably spaced brackets or standards 27. Journaled in the upper ends of the brackets 27 is a shaft 28 upon which is secured a gear 29 in mesh with the gear 12 secured to the main or motor-driven shaft 11 for rotating the shaft 28.

Secured to the shaft 28 adjacent the gear 29 is a cam 30 having its periphery provided with a recess or cut-away portion 31 and one of its outer faces provided with an approximately V-shaped projection 32 having the outwardly inclined cam-face 33. This projection 32, it will be observed, has its outer face come flush with the lowest surface of the recess 31. Pivotally connected upon the fixed stub-shaft 34, as clearly shown in Fig. 1, which shaft 34 is rigidly secured to the motor-frame 10, is a brake-actuating lever 35 having the upwardly and rearwardly extending portion 36 which has its end provided with an outwardly projecting pin 37 having the head 38 for holding the loosely mounted sleeve 39 upon the pin 37. When the motor B is stopped the brake lever 18 is in its horizontal position, as clearly shown in Figs. 1, 2 and 3, the sleeve 39 being adapted to seat in the recess or cut-away portion 31 of the cam 30.

Suitably secured to the top of the housing or casing A is a pair of suitably spaced supports or brackets 40. Journaled within the upper ends 41 of these supports or brackets 40 is a shaft 42 adapted to be located in vertical alinement with the shaft 28. Rigidly secured to the shaft 42 near the left-hand end thereof, is a vertically disposed record-supporting plate 43. This plate 43 is provided with a plurality of horizontally disposed shafts or rods 44 which are threaded into the plate 43 near the edge thereof, and provided with a shoulder 45, as clearly shown in Fig. 4. The end of the shaft 46 adjacent the threaded portion 47 is adapted to receive a loosely mounted collar 48 which is held in position by means of the bur 49.

Figure 13:
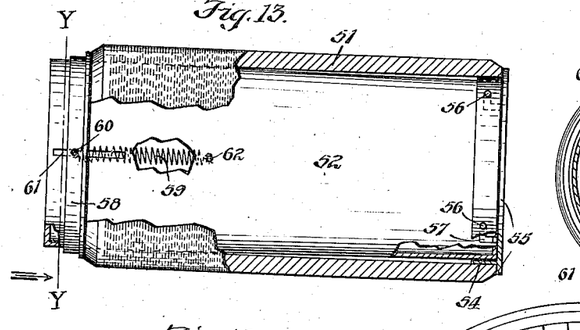
Fig. 13 is a view partly in section of one of my improved record-holders.
Figure 14:
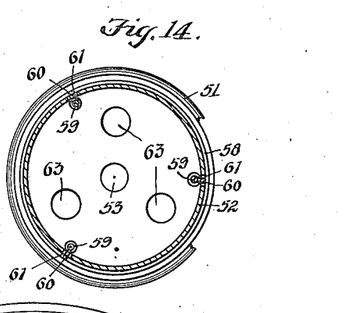
Fig. 14 is a sectional view thereof taken on the line *y—y* of Fig. 13.

The horizontally disposed shafts or rods 44 preferably twelve in number, are each provided with a rotatably mounted phonographic record-holder 50 adapted to hold the record 51 firmly in position thereon. Each of these record-holders, as more clearly shown in Fig. 13, consists of a metallic tubular element 52 tapering toward the end where the record 51 is first placed when in the act of placing the same on the record-holder. Each end of the record-holders 52 is closed or partly closed, and provided with an opening 53 for the reception of the supporting shafts or rods 44, as clearly shown in Fig. 4. The outer or smaller ends of the record-holders 52 are each provided with a removable ring 54 having the flange 55 for engaging the outer end or surface of the phonograph records 51. The ring 54 is provided with a plurality of inwardly projecting pins 56 adapted to be inserted into the right angular slotted openings 57 for normally locking said ring to the record-holder 52, and for guarding against the record becoming loose upon the holder and working its way off one end thereof. The opposite or larger ends of the record-holders 52 are each provided with a movable ring 58 having a flange adapted to engage the outer edge or surface of a record 51, as clearly shown in Fig. 13. This ring 58 is normally held in contact with the outer edge or surface of the record 51 by means of the coil springs 59 located within the record-holders 52 and connected at one end to the pins 60 projecting inwardly from the ring and extending into the interior of the record-holders through the slotted openings 61, and the opposite ends of the springs are each secured to an inwardly projecting pin 62. By this arrangement, it will be readily seen that the spring held ring 58 will take up all expansion and contraction of the records, thereby firmly holding the same in position by means of the rings 54 and 58 as well as by the well known manner of forcing the records upon the record-holders. The smaller ends of the record-holders 52, it will be observed, are provided with three openings 63, each of which openings is adapted to receive a cone-shaped lug 64 secured to the inner face of the plate 65, as clearly shown in Figs. 1, 2 and 9.

Figures 9, 10, 11, 12:
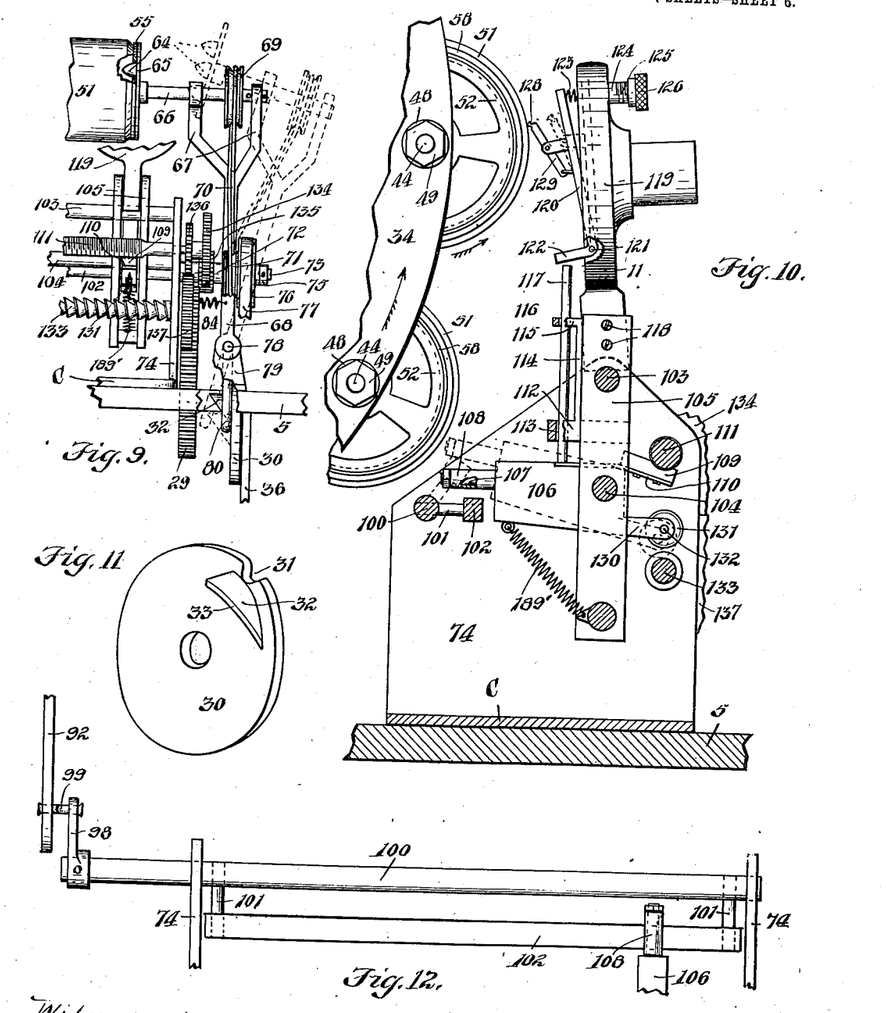
Fig. 9 is a detail showing the means for automatically engaging one of the record-holders at a time for rotating same when playing the record, and the cam for disengaging said means from the record-holder when the record carried thereby has been played.
Fig. 10 is a view showing the means for carrying the reproducer, and the means for engaging the needle with and disengaging the same from a phonograph record.
Fig. 11 is a perspective view of the cam which actuates the means adapted to engage the record-holders for rotating the same.
Fig. 12 is a plan view of the cam-actuated lever which causes the reproducer to travel back to the starting point after having played a record.

The plate 65 is rigidly secured to the inner end of the shaft 66 which is journaled in the forked end 67 of the vertically disposed arm 68. The shaft 66 is also further provided with the belt wheel 69 over which is adapted to pass a crossed belt 70, which is also adapted to run over the belt wheel 71, secured to the sleeve 72, which is loosely mounted upon the shaft 73, and which in turn is rigidly secured to one of the upper end plates 74 of the reproducer-supporting frame C. The sleeve 72 is held from slipping off the shaft 73 by means of the collar 75 which is secured thereto by means of a set-screw or the like. The sleeve 72 is further provided with a second belt wheel 76, preferably integral with the belt wheel 71 over which runs the belt 77, which at its lower end is adapted to run over the belt wheel 26, which latter wheel 26 is adapted to be rotated by means of the motor B for driving the aforesaid belts, as clearly shown in Fig. 2. The aforesaid vertically disposed arm 68, it will be observed from Fig. 2 of the drawings, is secured at its lowermost end to one end of the horizontally disposed shaft 78 journaled within the bearings or brackets 79. The opposite end of the shaft 78 is provided with a depending arm 80 having the lower right angular end 81 which is adapted to engage and be actuated by means of the cam-face 33 of the cam 30, as shown in Figs. 1, 9 and 11, for automatically disengaging the plate 65 from the end of the record-holder 52 after the record carried thereby has been played, as clearly shown in dotted lines in Fig. 9.

Figure 1:
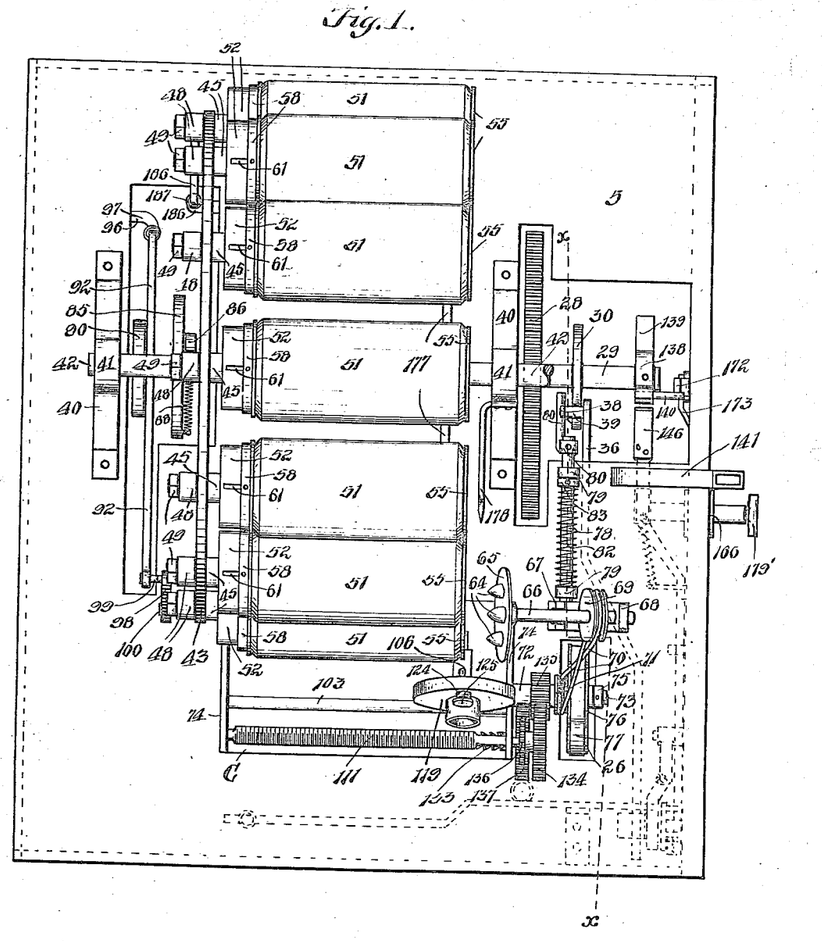
Figure 1 is a plan view of my invention with portions of the top thereof broken away.

The shaft 78, it will be noticed from Figs. 1 and 2 is rotated by means of a coil spring 82 and a horizontally adjusted collar 83, the object of the spring 82 being to allow the center of the shaft 66 to easily and readily adjust itself with the center of the record-holders 52 owing to the fact that some of the record-holders 52 are apt at times to be out of alinement with the shaft 66, and unless the shaft could readily adjust itself the lugs 64 of the plate 65 could not enter the openings 63 in the outer or smaller end of the record-holders for revolving the same. The arm 68 is normally held in a vertical position so as to cause the plate 65 to engage the outer or smaller end of the record-holders 52, as clearly shown in Fig. 9, by means of the coil spring 84, which spring further holds the right angular end 81 of the arm 80 in engagement with the inner face of the cam 30, as clearly shown in Fig. 9 so that when the face 33 engages the same it will cause the arm 68 to be carried into the position shown in dotted lines.

Referring to Figs. 1, 3 and 4, it will be seen that I provide the left end of the driving-shaft 28 with a wheel 85 having an arm 86 pivotally connected to the inner face thereof by means of the pin 87 near the edge thereof. The lower end of the arm 86 is connected with a coil spring 88 the opposite end of which is connected or secured to the pin 89. This spring 88 normally holds the lower end of the arm 86 in engagement with the shaft 28, as shown in Fig. 3, which shaft acts as a stop for the arm as is manifest. The upper end of the arm 86, it will be observed, is adapted to engage one of the loosely held collars 48 at each revolution of the wheel 85 which will be more fully described hereinafter in the operation of the device.

Secured adjacent the outer face of the wheel 85 and upon the shaft 28 is a cam 90 having the cam-face 91, which is adapted to actuate an operating lever 92 pivotally held in position by means of the pin 93. The lever 92 is provided with a loosely held collar 94 upon the pin 95 which collar 94 is adapted to engage the periphery of the cam 90. The rear end of the lever 92 is connected to a coil spring 96 the opposite end of which is connected to a suitable bracket 97 secured to and depending from the top plate 5 of the housing or casing A. The spring 96 normally holds the collar 94 in engagement with the periphery of the cam 90. The front or forward end of the lever 92 is connected to an arm 98, as clearly shown in Fig. 3 by means of the link 99. The arm 98 is secured to the projecting end of the rod or shaft 100, as clearly shown in Figs. 3 and 12, which rod 100 is journaled in the upper end plate 74 of the reproducer-supporting frame C. The shaft 100 has connected with it by means of the pins 101 and running parallel therewith, a rod 102, which rod is suitably spaced from the shaft 100, as clearly shown in Figs. 10 and 12. The rod designated 102 is adapted to actuate the reproducer-supporting element, which will now be described.

Rigidly secured to the end plates 74 of the frame C, as clearly shown in Figs. 4 and 10, is a pair of spaced supporting guide rods 103 and 104 located in vertical alinement as shown. These rods 103 and 104 pass through suitably spaced and vertically disposed bars 105 adapted to act as a reproducer-supporting carriage. Loosely mounted upon each rod 104 between the two upright bars 105 is a carriage block 106 having the rearwardly projecting pin 107 upon which is rotatably mounted a collar 108, which collar is adapted to engage the rod 102 when the carriage block 106 is in the position shown in dotted lines in Fig. 10. When the carriage block 106 is in the position shown in full lines in Fig. 10, the phonograph is in the act of playing a record, and it will be observed that the threaded plate 109 which is suitably secured to a spring arm 110 which in turn is suitably secured to the top of the carriage block 106, is in engagement with the finely threaded rod 111 journaled in the end plate 74 of the frame C.

Rigidly secured between the carriage bars or arms 105 and a suitable distance above the carriage block 106, is an arm 112 having an opening 113 therein. Integral with the arm 112 and extending upwardly therefrom, is an arm 114 having an outwardly projecting ear 115 provided with the opening 116. Adapted to be loosely held within these openings 113 and 116, is a vertically disposed rod 117 which is adapted to rest upon the top of the carriage block 106, as clearly shown in Fig. 10. The object of this rod 117 will be described hereinafter. Adjustably secured by means of the set-screws 118 to the upper ends of the carriage bars or arms 105, is the reproducer 119. The reproducer 119 is provided with an arm 120 pivotally held by means of the pin 121. The lower end of this arm 120 is provided with the right angular end 122, which when in the position shown in full lines in Fig. 10 is adapted to seat adjacent the upper end of the pin or rod 117. The upper end of the pivotally held arm 120 is connected to a coil spring 123, a portion of which is adapted to be held in the tubular element 124 rigidly secured to the reproducer 119. This tubular element 124 is provided with a plurality of external threads 125 to allow an internally threaded cap 126 to be secured thereto. Adapted to engage the inner face of said cap 126 is a pin 127 which at its opposite end is adapted to engage the free end of the coil spring 123. By this arrangement, it will be observed, I may adjust the lever or arm 129 so as to cause the needle 128 secured to the pivotally held arm 129 to either press lightly or hard against the records 51 to produce a light or loud sound from the record. By turning the cap 126 in one direction, it will cause the pin 127 to engage the spring 123 causing it to exert more pressure against the arm 120 than by turning the cap in the opposite direction which causes the spring pressure against the arm 120 to be weakened. When the cap 126 is in the position shown in dotted lines in Fig. 10, it will be noticed, that the pin or rod 117, is adapted to engage the right angular end 122 of the arm 120 causing said arm to take the position shown in dotted lines, thereby automatically disengaging the needle from the record 51 immediately after the same has been played in order to allow the reproducer-supporting carriage to travel to the left or starting point without allowing the needle 128 to engage the record or record-holder which would naturally cause the same to scratch or destroy the same.

The carriage block 106, it will be observed, is provided with an upwardly extending arm 130 having its end forked to allow for the reception of the disk 131, which is pivotally held in position by means of the pin 132 and adapted to engage the worm-shaft 133 when in the position shown in dotted lines in Fig. 10 for causing the reproducer carriage to travel to the left or starting point. It will be observed, that when the threaded bar 109 is in engagement with the threaded shaft 111, that the disk 131 is out of engagement with the worm-shaft 133 and just the reverse when the threaded bar is out of engagement with the threaded shaft 111. The threaded shaft 111 is adapted to cause the reproducer-supporting carriage to travel to the right and the worm-shaft 133 is adapted to cause the same to travel toward the left. The right-hand end of the threaded shaft 111 is provided with the gear 134 which is adapted to mesh with, and be driven by means of the gear 135 secured to the loosely mounted sleeve 72. The threaded shaft 111 is still further provided with the gear 136, which gear is adapted to mesh with the gear 137 secured to the worm-shaft 133 driving the same in the opposite direction to the threaded shaft 111.

In Fig. 2 of the drawings, it will be observed that the reproducer 119 is provided with the suitable horn c.

The coin-controlled mechanism will be described.

Figure 5:
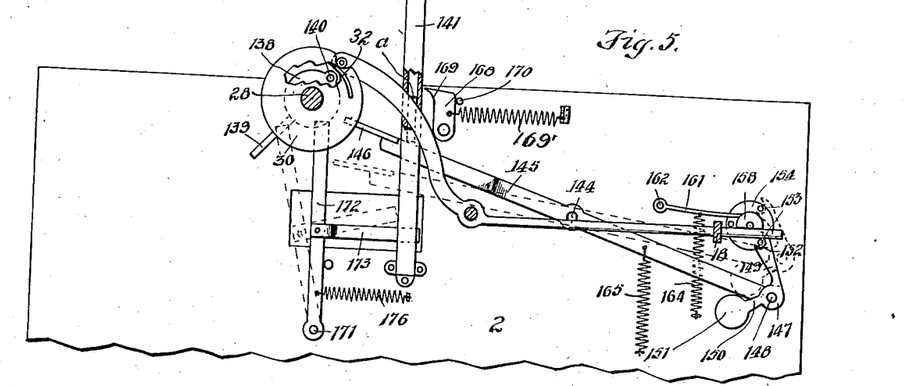
Fig. 5 is a view taken on the line *x—x* of Fig. 1 showing the levers and cams in their proper positions when the motor is stopped.

Referring to Figs. 1 and 5 of the drawings, it will be observed I provide the driving shaft 28 with a cam 138 having the spring arm 139 which is suitably secured thereto. Oppositely disposed from the spring arm 139 and projecting outwardly from the side face of the cam 138, is a pin 130

140. The mechanism the spring arm 139 and pin 140 are adapted to actuate, will now be described.

Suitably secured to the side wall 2 of the housing or casing A is a coin-chute 141 which is provided with a slotted opening 142 and a lug 143, which lug is located in the coin-passage, as clearly shown in Fig. 4.

Figure 6:
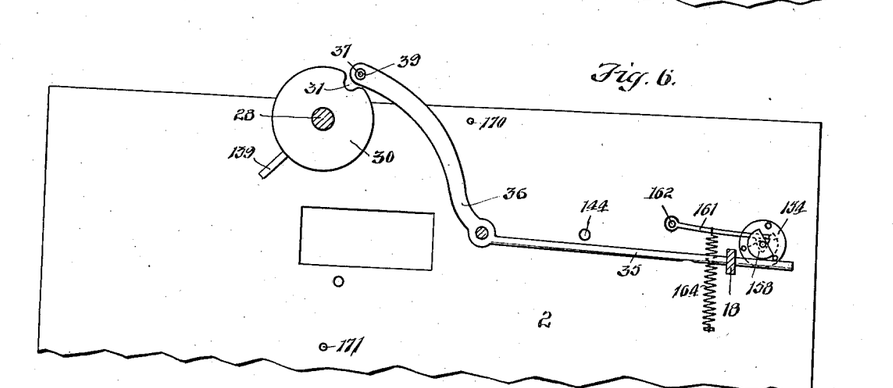
Fig. 6 is a similar view showing the position the cam-operated lever assumes while the two records are being played.
Figure 7:
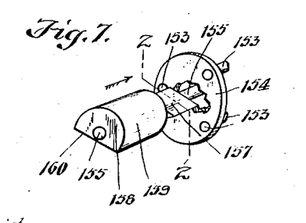
Fig. 7 is a perspective view of the cam element adapted to actuate the lever for releasing and engaging the brake lever with the governor friction wheel.
Figure 8:
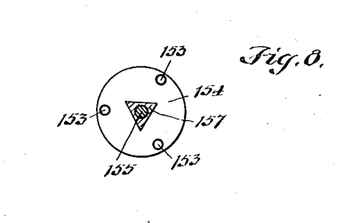
Fig. 8 is a sectional view taken on the line *z—z* of Fig. 7.

Pivotally secured by means of the pin 144 to the inner face of the side wall 2 in an inclined position, is a coin and cam-actuated lever 145 having its upper end provided with a spring arm 146. The upper end of the arm 146 is adapted to pass through the slotted opening 142 of the coin-chute, as clearly shown in Fig. 5. At the lower or opposite end of said lever 145 is a dog 147 which is pivotally held thereto by means of the pin 148. This dog 147, it will be noticed is in the shape of a bell-crank having the two arms 149 and 150, the arm 150 being provided with the weighted end 151 and the arm 149 with the recess or notch 152 adapted to receive one of the outwardly projecting pins 153 secured to the plate 154. The plate 154 is rigidly secured to the shaft 155, which shaft is loosely held within the tubular element 156, which element is suitably secured to the side wall 2. The shaft 155 is further provided with an equilateral triangular cam 157 which cam is integral with an approximately semi-cylindrical cam 158 having the curved face 159 and the flat face 160. To normally hold the cam element just described, in the three different positions as shown in Figs. 5 and 6, I employ an arm 161 which is pivotally held at one end by means of a pin 162. The free end of this arm 161 is adapted to rest upon one of the faces 163 of the equilateral triangular cam 157, and is normally held in engagement with one of these faces at a time by means of the coil spring 164. The aforesaid pivotally held lever 145 is also normally held in an inclined position by means of the coil spring 165.

Loosely mounted in the tubular sleeve 166, as clearly shown in Fig. 4, is a shaft 167, which shaft is provided with an arm 168 having the curved lip 169' as clearly shown in Fig. 5. This arm 168 is normally held in a vertically disposed position by means of the coil spring 169 and is adapted to engage a stop 170. The opposite end of the shaft 167 is provided with a cross-head or handle 170 for actuating the arm 168.

Pivotally secured by means of the pin 171 to the side wall 2 adjacent the coin-chute 141 as clearly shown in Fig. 5, is a vertically disposed lever 172 to which is suitably secured a horizontally disposed arm 173 adapted to pass through the slotted opening 174 of the chute 141, as clearly shown in Figs. 4 and 5. This pivotally held lever 172 is adapted to be actuated for allowing the coin $a$ to pass through the chute 141 and into the coin compartment 9 by means of the cam-arm 140. This lever 172 is normally held in a vertical position against the stop 175 by means of the coil spring 176.

Referring to Fig. 2 of the drawings, it will be seen that I suitably secure to the shaft 42 a dial 177 and to one of the brackets or standards 40, a suitable pointer 178. The end of the shaft 42 is provided with a handle 179 which enables a party to turn the record-wheel D in the direction of the arrow shown in Fig. 2 to bring the number of the record which is desired to be played in alinement with the pointer 178. It will be observed from Fig. 3 of the drawings, that the record-wheel D can only be turned in one direction by hand indicated by the arrow 179' as the collar 48 will strike the arm 86, which arm will be stopped by the shaft 28 if attempted to be turned in the opposite direction as indicated by the arrow 180, which when the record-wheel D is turned in the direction of the arrow 179' by hand, the collar 48 will strike the back face 181 of the arm 86 throwing the same forward until the collar disengages the arm 86 when the spring 88 will then bring the arm back to its normal position, as shown causing the face 181 to engage the collar 48 as shown in dotted lines in Fig. 3. To normally hold the record-wheel D in position, I employ a lever 182 having the upper curved face 183 and the recess or notch 184 for the reception of one of the collars 48, as clearly shown in Fig. 3. This lever 182 is pivoted as at 185 and provided with the right angular arm 186 to the end of which is connected a coil spring 187 which at its opposite end is connected to a suitable bracket 188, which spring is adapted to normally hold the notched portion 184 in engagement with the collar 48 to normally hold the wheel stationary.

I inclose the top of the phonograph by means of a suitable cover E having at least one glass side so as to enable a party to see the numbers upon the dial 177.

The operation of my coin-controlled phonograph will now be described.

When it is desired to play the phonograph, I first turn the record-wheel D so that the pointer 178 will point toward the number of the record I desire to play, thereby causing the spring-held arm 86 to stand in the position as shown in Fig. 3 in dotted lines. After this has been done, I place a coin in the coin-chute 141, which coin will stop and rest upon the pivotally held lever 145 (see Fig. 5) and in order to start the motor B, I turn the handle 170 to the right which causes the curved face 169 of the arm 168 to engage the coin $a$ and force the lever 145 to the position shown in dotted lines, which causes the dog 147 to turn the semi-cylindrical cam 158 from the position shown in Fig. 5 to that shown in full lines in Fig. 6. This cam 158 forces the lever 35 downwardly causing the roller 39 to raise out of engagement with the recess 31 of the cam 30 and at the same time raising the brake lever 18 so as to cause the fabric 20 to disengage the friction-wheel 15 secured upon the governor-shaft 14. This allows the motor B to start running. In the meanwhile, the lever 145 has returned to its normal position, as shown in full lines and the roller 39 connected with the end 36 of the lever 35, is adapted to roll upon the periphery of the cam 30, and the curved face 159 of the semi-cylindrical cam 158 causes the lever 35 to hold this position as clearly shown in Fig. 6. The reproducer-supporting carriage is adapted to be carried to the left or starting point just as soon as the motor is started by means of the worm-shaft 133, and the arm 68 is held in the position shown in dotted lines in Fig. 9 caused by the cam-face 33 forcing the end 81 of the arm 80 outwardly until the cam-face 33 has passed the end 81 of the arm 80 which allows the spring 84 to bring the arm 68 into its vertical position, as clearly shown in full lines in Fig. 9, thereby causing the lug 65 to enter the opening 63 of one of the record-holders 52 for rotating the same.

As soon as the record 51 has started to rotate after the carriage has reached the starting point, the collar 94 rotatably mounted on the pin 95 secured to the lever 92 leaves the cam-face and is adapted to roll upon the periphery of the cam, thereby lowering the rear end of the lever 92 which causes the forward end to rise thereby raising the arm 98 and causing the bar 102 to lie in horizontal alinement with the rod 100 which allows the spring 189' to release the disk 131 from the worm 133 thereby allowing the threaded bar 109 to engage the threaded shaft 111 causing the pin 117 to be lowered and allowing the needle 128 to engage the record for playing the same as clearly shown in Fig. 10. As soon as the threaded bar 109 engages the threaded shaft 111, the reproducer-supporting carriage is caused to travel to the right. When the record is about three-fourths played, the spring arm 139 of the cam 130 is adapted to engage the spring lip 146 of the lever 145 pressing this end of the lever down, thereby raising the opposite end causing the dog to turn the semi-cylindrical cam 158 to the position shown in dotted lines in Fig. 6, which keeps the roller 139 from entering the recess of the cam 30 at the end of one complete revolution thereof. When the cam 30 has revolved one complete revolution, the record has been played and owing to the position that the semi-cylindrical cam 158 holds the lever 35, the roller 39 cannot enter the recess 31 to apply the brake lever 18 to the friction-wheel 15 to stop the motor B so as the cam revolves the cam-face 33 engages the end 81 of the arm 80 causing the lever 68 to take the position shown in dotted lines in Fig. 9. As soon as the arm 68 has taken this position, the reproducer-supporting carriage starts to travel to the left or starting point, the record-wheel D at the same time being rotated by means of the arm 86 a part of a revolution sufficiently to bring the next record around to the position occupied by the record just played. As soon as the new or second record is in position, the arm 68 is brought back into its vertical position thereby causing the lug 64 to enter the openings 63 of the record-holder for rotating the same. Just after the record starts to rotate, the collar 94 rotatably mounted upon the pin 95 of the lever 92 leaves the cam-face 91 and is adapted to travel on the periphery of the cam 90 thereby raising the forward end of the lever 92 and causing the rod 102 to again lie in horizontal alinement with the rod 100, which causes the carriage block 106 to drop into the position shown in full lines in Fig. 10, thereby causing the threaded block 109 to engage the threaded rod 111 and to cause the pin 117 to disengage the arm 122 to allow the needle 128 to engage the record for playing the same. Just as soon as the threaded block 109 engages the rod 111, the reproducer-supporting frame again starts to travel to the right causing the second record to be played. Now, when the spring-held arm 139 strikes the end of the lever 145, the second time, it causes the dog 147 to bring the semi-cylindrical cam 158 back to its normal position as clearly shown in Fig. 5, and just as soon as the spring-held arm 68 is again carried into the position shown in dotted lines in Fig. 10, the roller 39 is adapted to fall into the recess 31 of the cam 30, thereby causing the fabric 20 of the brake lever 18 to fall back into its horizontal position owing to the fact that the lever 35 passes through one end thereof, thereby causing the fabric brake 20 to engage the periphery of the friction-wheel 15 secured to the governor-shaft 14 for stopping the motor B. From this description, as to the operation of this device, it will be readily seen that the phonograph will automatically play two records for a single coin.

In case a party should not turn the record-wheel D and select the record to be played before placing the coin in the coin-chute, the spring-arm 86 will bring the next record up into position while the reproducer-supporting carriage is being carried to the left or starting point so it will be readily seen that it is not necessary for a party to select the record to be played.

Referring to Figs. 4 and 5 of the drawings, it will be readily seen that when the cam 138 revolves approximately one-fourth of a revolution, that the pin 140 will engage or strike the upper end of the lever 172 thereby causing the threaded end of the arm 173 upon which the coin $a$ is resting, as shown in Fig. 4, thereby allowing the coin $a$ to pass downwardly through the coin-chute 141 and enter the coin compartment 9. After the coin is allowed to pass the lug 143 and pass downwardly through the coin-chute, the spring 176 will carry the arm 172 back to its normal position as clearly shown in full lines in Fig. 5.

My clock-controlled means for starting and stopping the motor B of the phonograph will now be described. This attachment may be used with or without the coin-controlled mechanism. The clock F is adapted to be set at any suitable place adjacent the brake lever 18 and the means for actuating the brake lever consists of a cam-wheel 189 having the arm or lug 190. The cam-wheel 189 is secured to the sleeve 191 upon which sleeve is secured to the minute hand of the clock is secured. This sleeve 191 is loosely mounted upon the shaft 192. Journaled within the clock-frame 193 and transversely thereof, is a shaft 194 having its end adjacent the cam 189 provided with an arm 195, which arm is rigidly secured thereto. The opposite end of the shaft 194 is provided with an arm 196 having a lower flat face or surface and is normally held in position by means of the coil spring 197. It will be observed that the spring 197 normally holds the arm 195 in contact with the stop 198. Pivotally held adjacent the arm 196 is a lever 199 having the long end 200 and the short end 201. The short end 201 is adapted to engage the under flat face of the arm 196 as clearly shown in Fig. 15 and the long end 200 thereof is adapted to engage the underside of the right angular end 202 of the brake lever 18. The clock mechanism is adapted to start the motor B of the phonograph and cause the same to run long enough to play one record each hour. It will be observed from Fig. 16 of the drawings that when the minute hand 103 is at the hour mark on the dial 104 of the clock, that the cam-arm 190 is in engagement with the arm 195 in the shaft 194. Now as the minute hand moves to the right, it moves the arm 195 thereby causing the free end of the arm 196 to move downwardly thereby causing the short end of the lever 199 to move downwardly and causing the long end to rise, thereby raising or releasing the brake lever 18 from the friction-wheel 15 mounted or secured to the governor-shaft 14. This cam-arm 195 holds the fabric 20 of the brake lever 18 out of engagement with the friction-wheel 15 the length of time required to play the record which is approximately two minutes. If it is desired to have the motor run more than once an hour, by means of the clock mechanism, I simply provide the cam-wheel 189 with as many additional cam-arms as the number of times it is desired to run the motor.

The means for starting and stopping the motor shown in Fig. 17 is only used when it is not desired to use either the coin or clock-controlled mechanism. To accomplish my object, I employ an arm 204 pivotally held in position by the pin 205 adjacent the free or long end of the brake lever 18. The pin 205 is provided with an arm or handle 206 for engaging or disengaging the arm 204 with the brake lever 18. When the motor has stopped the arm 204 stands as shown in full lines in Fig. 17, and when the arm 204 is placed in the position shown in dotted lines, the brake lever 18 is adapted to rise to the position shown in dotted lines by means of the coil spring 207, thereby releasing the fabric 20 from engagement with the periphery of the friction-wheel 15 which allows the motor to run. By this arrangement, it will be seen that I may play all of the records or as many records carried by the record-wheel automatically in succession, or I may play one record and then turn the arm down, as shown in full lines in Fig. 17, to engage the brake lever 18 for stopping the motor.

Having described my invention what I claim as new, and desire to secure by Letters Patent, is:

1. In a device of the class described, a motor, means for starting said motor, a rotatable record carrying wheel, a plurality of record holders arranged at regular intervals on said wheel, a rotary shaft driven by said motor, a projection on said wheel adjacent each of said record holders, means carried by said shaft and adapted to engage said projections to move said wheel through a partial revolution to bring the records successively and intermittently into operative position, means for holding said wheel in position between the partial revolutions thereof, a brake for stopping said motor, a lever controlling said brake, a cam on said shaft for actuating said lever, a second cam mounted adjacent said lever and means carried by said shaft for actuating said cam whereby said lever is held out of operation during each alternate revolution of said shaft, substantially as described.

2. In a device of the class described, a motor, a rotatable wheel, a plurality of record holders projecting from one face of said wheel, a corresponding number of projections extending from the opposite side of said wheel, a rotary shaft adjacent said wheel and driven by said motor, a pivoted arm carried by said shaft and adapted to engage said projections successively to impart a partial revolution intermittently to said wheel, and a notched spring arm adapted to engage said projections to hold said wheel in position between the partial revolutions thereof, means for manually turning said wheel in the same direction, said pivoted arm preventing reverse movement thereof, means for stopping said motor, a lever controlling said means and a cam on said shaft for actuating said lever, substantially as described.

3. In a device of the class described, a motor, means for starting said motor, a rotatable wheel, tapering record holders on said wheel adapted to carry phonographic records, a locking ring on each of said record holders, said locking ring being arranged about the outer end of the holders and between the same and the adjacent portion of the record, an annular flange on said ring adapted to engage the outer end of the record, and means for rotating said wheel intermittently a part of the revolution to cause said records to move successively in one direction, substantially as described.

4. In a device of the class described, a motor, a shaft driven by means of said motor, a rotatable wheel, a plurality of phonographic record-holders carried by said wheel, a cam secured to said shaft, means actuated by said cam for engaging one of said record-holders at a time for rotating the same, and means for disengaging said means from said record-holders.

5. In a device of the class described, a casing, a motor inclosed in said casing, a shaft adapted to be driven by means of said motor, a horizontally disposed shaft journaled on top of said casing, a circular plate secured to said shaft, a plurality of tubular record-holders rotatably carried by means of said circular plate in a horizontally disposed position, means for engaging and rotating one of said record-holders at a time, means for disengaging said means from said record-holders, a cam secured to the aforesaid first-mentioned shaft for rotating said record-holding plate a part of a revolution at each revolution of said cam.

6. In a device of the class described, a casing, a motor inclosed in said casing, a shaft adapted to be driven by means of said motor, a horizontally disposed shaft journaled on top of said casing, a circular plate secured to said shaft, a plurality of tubular record-holders rotatably carried by means of said circular plate in a horizontally disposed position, means for engaging and rotating one of said record-holders at a time, means for disengaging said means from said record-holders, a cam secured to the aforesaid first-mentioned shaft for rotating said record-holding plate a part of a revolution at each revolution of said cam, a reproducer, a pivotally held arm carried by said reproducer and having a needle secured thereto adapted to engage the record upon the record-holder adapted to be rotated, and means for automatically disengaging said needle from the record when the same has been played.

7. In a device of the class described, a casing, a motor inclosed in said casing, a shaft adapted to be driven by means of said motor, a rotatable wheel adapted to be mounted in bearings secured to the top of said casing, a plurality of record-holders suitably carried by means of said wheel and near the edge thereof, a cam for actuating means for intermittently engaging said record-holders, means for rotating said record-holders, means for disengaging said means from said record-holders, a cam adapted to intermittently rotate said wheel in one direction a part of a revolution at each revolution thereof, and means for starting and stopping the aforesaid motor.

8. In a device of the class described, a casing, a motor inclosed in said casing, a shaft adapted to be driven by means of said motor, a rotatable wheel adapted to be mounted in bearings secured to the top of said casing, a plurality of record-holders suitably carried by means of said wheel and near the edge thereof, a cam for actuating means for intermittently engaging said record-holders, means for rotating said record-holders, means for disengaging said means from said record-holders, a cam adapted to intermittently rotate said wheel in one direction a part of a revolution at each revolution thereof, a reproducer, a movable carriage for supporting said reproducer, means for automatically engaging the needle of said reproducer with and from a phonographic record, and means for starting and stopping the aforesaid motor.

9. The combination with a phonograph, of a horizontally disposed shaft having a circular plate secured thereto, a plurality of tubular record-holders rotatably carried thereby in a horizontally disposed position near the edge thereof, a dial secured to said shaft having a number thereon for each record-holder carried by said plate, a stationary indicator, a handle secured to said shaft for turning said plate to bring any desired record in alinement with the point of said indicator, and means for normally holding said plate in a locked position.

10. The combination with a motor, a shaft adapted to be driven by said motor, a rotatable wheel, a plurality of phonographic records rotatably carried by means of said wheel, a reproducer having a pivotally held arm, and a needle secured thereto, a traveling carriage for supporting said reproducer, means for causing said carriage to travel to the right, means for engaging said needle with one of said phonographic records, a cam on said motor shaft and means actuated by said cam for disengaging said needle from the record after the same has been played.

11. The combination with a phonographic record, a reproducer having an L-shaped arm pivotally secured thereto and provided with an arm having a needle secured to one end thereof, and means for engaging and disengaging said needle with and from the phonographic record.

12. In a device for rotating a record-holder having a plurality of openings in one end thereof, a movable arm having a forked upper end, a shaft journaled in said forked end, a circular plate secured to one end thereof, a plurality of cone-shaped lugs secured to one face of said plate, said lugs being adapted to intermittently enter the openings in said record-holder, and means for driving the aforesaid shaft for rotating said record-holder, while the lugs are held within said openings.

13. The combination with a phonographic record, a reproducer having an L-shaped needle-supporting arm pivotally connected thereto, a loosely held pin adapted to be held out of engagement with said arm, and means for causing one end of said pin to engage said arm for disengaging the needle from the phonographic record.

14. In a device of the class described, a reproducer in combination with a plurality of records, means for moving said records successively into position adjacent said reproducer, a driven shaft and means for automatically coupling said shaft to the record adjacent said reproducer, substantially as described.

15. In a device of the class described, a reproducer and a plurality of records in combination with means for moving said records successively into a position adjacent said reproducer, a driven shaft, a clutch on said shaft and means for automatically engaging said clutch with said records successively and for disengaging the same therefrom, substantially as described.

16. In a device of the class described, a reproducer and a plurality of records in combination with means for moving said records successively into a position adjacent said reproducer, an arm pivotally mounted adjacent said reproducer, a driven clutch shaft and clutch carried by said arm, a motor shaft, a cam on said motor shaft and means actuated by said cam for rocking said arm and clutch, substantially as described.

17. In a device of the class described, a reproducer and a plurality of records in combination with means for moving said records successively into a position adjacent said reproducer, a driven shaft, a cam on said shaft, a pivotally mounted arm engaging said cam and means actuated by said arm for engaging and disengaging the reproducer needle and the record, substantially as described.

18. In a device of the class described, a rotary record-holder, ways adjacent said holder, a carriage slidably mounted on said ways, a reproducer on said carriage, a driven threaded shaft adjacent said carriage and a worm-shaft parallel therewith, intermeshing gears on said shafts, a member pivotally mounted on said carriage, means on said member for engaging said threaded shaft when said member is in one position and means on said member for engaging said worm-shaft when said member is in another position, means for rocking said member, a pivotally mounted arm on said reproducer for holding the needle, and means interposed between said arm and said member whereby the rocking of the latter to engage said worm shall actuate said arm to retract the needle, substantially as described.

In testimony whereof I have signed my name to this specification in the presence of two subscribing witnesses.

PETER M. RAVENSKILDE.

Witnesses:
P. N. WAGNER,
R. C. BRENEISA.